US009353857B2

(12) United States Patent
Waku et al.

(10) Patent No.: US 9,353,857 B2
(45) Date of Patent: May 31, 2016

(54) VEHICLE CONTROL DEVICE

(75) Inventors: Kousuke Waku, Hadano (JP); Hideshi Wakayama, Hadano (JP); Noritaka Aoyama, Atsugi (JP)

(73) Assignee: JATCO LTD, Fuji-Shi (JP)

( * ) Notice: Subject to any disclaimer, the term of this patent is extended or adjusted under 35 U.S.C. 154(b) by 37 days.

(21) Appl. No.: 14/240,593

(22) PCT Filed: Jul. 18, 2012

(86) PCT No.: PCT/JP2012/068226
§ 371 (c)(1),
(2), (4) Date: Feb. 24, 2014

(87) PCT Pub. No.: WO2013/031408
PCT Pub. Date: Mar. 7, 2013

(65) Prior Publication Data
US 2014/0207347 A1  Jul. 24, 2014

(30) Foreign Application Priority Data

Aug. 30, 2011  (JP) .................................. 2011-187370

(51) Int. Cl.
| F16H 61/12 | (2010.01) |
| F16H 61/70 | (2006.01) |
| F16H 61/662 | (2006.01) |
| F16H 59/46 | (2006.01) |
| F16H 37/02 | (2006.01) |
| F16H 57/01 | (2012.01) |

(52) U.S. Cl.
CPC ............... *F16H 61/12* (2013.01); *F16H 59/46* (2013.01); *F16H 61/66272* (2013.01); *F16H 61/702* (2013.01); *F16H 2037/023* (2013.01); *F16H 2057/014* (2013.01); *F16H 2059/465* (2013.01); *F16H 2312/14* (2013.01)

(58) Field of Classification Search
CPC .................................................. F16H 61/66231
See application file for complete search history.

(56) References Cited

U.S. PATENT DOCUMENTS

| 4,840,247 A * | 6/1989 | Kashihara et al. ............ 180/249 |
| 8,142,329 B2 * | 3/2012 | Ortmann ................ B60K 6/105 |
| | | 180/165 |
| 8,585,542 B2 | 11/2013 | Takahashi et al. |
| 2011/0015839 A1 | 1/2011 | Takahashi et al. |

FOREIGN PATENT DOCUMENTS

| JP | 05-079554 A | 3/1993 |
| JP | 05-099302 A | 4/1993 |
| JP | 2003-336662 A | 4/1993 |
| JP | 06-213317 A | 8/1994 |
| JP | 2011-021722 A | 2/2011 |

\* cited by examiner

*Primary Examiner* — Ramya Burgess
*Assistant Examiner* — David Morris
(74) *Attorney, Agent, or Firm* — Foley & Lardner LLP (57) ABSTRACT

A vehicle control device for controlling a vehicle including a first power transmission mechanism arranged between a drive source and a drive wheel, and a second power transmission mechanism which is arranged in series with the first power transmission mechanism and which changes a speed ratio between an input shaft and an output shaft, includes slip detection means configured to detect whether or not a slip occurs in the first power transmission mechanism, and shift means configured to reduce the slip by shifting the second power transmission mechanism in a case where occurrence of the slip is detected by the slip detection means.

10 Claims, 8 Drawing Sheets

VEHICLE CONTROL DEVICE

TECHNICAL FIELD

The present invention relates to a vehicle control device.

BACKGROUND ART

Conventionally, a vehicle including a continuously variable transmission and a sub-transmission between a drive wheel and an engine is disclosed in JP5-079554A.

SUMMARY OF INVENTION

In the continuously variable transmission, by supplying a hydraulic pressure, a belt is sandwiched by pulleys. In the sub-transmission, by supplying the hydraulic pressure, a frictional engagement element is engaged.

However, in the above invention, in a case where the supplied hydraulic pressure is varied, or in a case where a radical torque change is generated on the drive wheel side due to radical deceleration, running on a rough road, or the like, there is a fear that the frictional engagement element of the sub-transmission is slipped. When a slippage occurs in the frictional engagement element, there is a problem that durability of the frictional engagement element is lowered.

The present invention is achieved in order to solve such a problem, and an object thereof is to suppress occurrence of the slippage in the frictional engagement element and to improve the durability of the frictional engagement element.

A vehicle control device according to an aspect of the present invention is a vehicle control device for controlling a vehicle including a first power transmission mechanism arranged between a drive source and a drive wheel, and a second power transmission mechanism which is arranged in series with the first power transmission mechanism and which changes a speed ratio between an input shaft and an output shaft, the vehicle control device including slip detection means configured to detect whether or not a slip occurs in the first power transmission mechanism, and shift means configured to reduce the slip by shifting the second power transmission mechanism in a case where occurrence of the slip is detected by the slip detection means.

According to this aspect, in a case where the slip occurs in the first power transmission mechanism, by shifting the second power transmission mechanism, the slip occurred in the first power transmission mechanism is suppressed and durability of the first power transmission mechanism can be improved.

DESCRIPTION OF EMBODIMENTS

Hereinafter, an embodiment of the present invention will be described with reference to the attached drawings. In the following description, a "speed ratio" of a certain transmission mechanism is a value obtained by dividing an input rotation speed of the transmission mechanism by an output rotation speed of the transmission mechanism. A "lowest speed ratio" indicates that the speed ratio of the transmission mechanism corresponds to a maximum gear ratio to be used at the time of starting a vehicle or the like. A "highest speed ratio" corresponds to a minimum gear ratio of the transmission mechanism.

Figure 1:
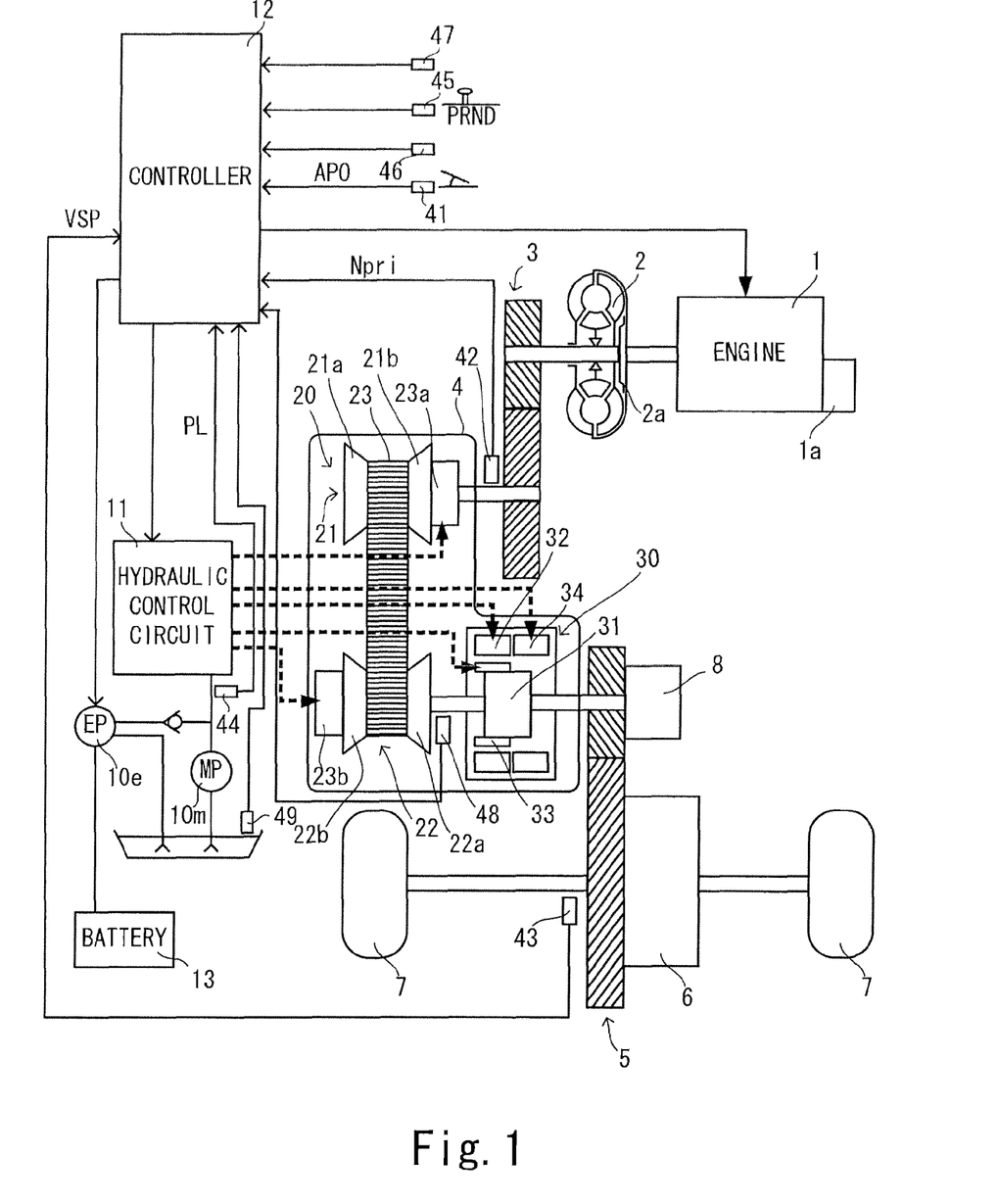
FIG. 1 is a schematic configuration diagram of a coast stop vehicle of the present embodiment.

FIG. 1 is a schematic configuration diagram of a coast stop vehicle according to the embodiment of the present invention. This vehicle includes an engine 1 as a drive source, and output rotation of the engine 1 is transmitted to a drive wheel 7 via a torque converter 2 having a lock-up clutch 2a, a first gear train 3, a continuously variable transmission (hereinafter, simply referred to as the "transmission 4"), a second gear train 5, and a final reduction gear 6. The second gear train 5 is provided with a parking mechanism 8 for locking an output shaft of the transmission 4 so as not to mechanically rotate at the time of parking. The engine 1 includes a starter 1a to be used at the time of starting the engine.

The transmission 4 is provided with a mechanical oil pump 10m to be driven by inputting the rotation of the engine 1 and utilizing a part of power of the engine 1, and an electric oil pump 10e to be driven by receiving power supply from a battery 13. The electric oil pump 10e is formed by an oil pump main body, an electric motor for driving and rotating this, and a motor driver, and is capable of controlling an operation load to an arbitrary load or in multistage. The transmission 4 is also provided with a hydraulic control circuit 11 for adjusting a hydraulic pressure (hereinafter, referred to as the "line pressure PL") from the mechanical oil pump 10m or the electric oil pump 10e and supplying to parts of the transmission 4.

The transmission 4 includes a belt-type continuously variable transmission mechanism (hereinafter, referred to as the "variator 20"), and a sub-transmission mechanism 30 provided in series with the variator 20. The phrase "provided in series" indicates that the variator 20 and the sub-transmission mechanism 30 are provided in series on a power transmission route from the engine 1 to the drive wheel 7. The sub-transmission mechanism 30 may be directly connected to an output shaft of the variator 20 as in this example, or may also be connected via other transmission or power transmission mechanisms (such as a gear train). Alternatively, the sub-transmission mechanism 30 may be connected to a former part (the input shaft side) of the variator 20.

The variator 20 includes a primary pulley 21, a secondary pulley 22, and a V belt 23 looped over the pulleys 21, 22. The pulleys 21, 22 respectively include fixed conical plates 21a, 22a, movable conical plates 21b, 22b arranged in a state where sheave surfaces face the fixed conical plates 21a, 22a, the movable conical plates forming V grooves with the fixed conical plates 21a, 22a, and hydraulic cylinders 23a, 23b provided on back surfaces of the movable conical plates 21b, 22b, for displacing the movable conical plates 21b, 22b in the axial direction. When hydraulic pressures supplied to the hydraulic cylinders 23a, 23b are adjusted, widths of the V grooves are changed, contact radiuses between the V belt 23 and the pulleys 21, 22 are changed, and a speed ratio of the variator 20 is continuously variably changed.

In order to obtain a large torque capacity even in a case where the hydraulic pressure supplied to the hydraulic cylinder 23a of the primary pulley 21 is low, a pressure receiving area of the hydraulic cylinder 23a of the primary pulley 21 is desirably large. The primary pulley 21 and the secondary pulley 22 are provided in such a manner that a pressure receiving area of the primary pulley 21 is larger than a pressure receiving area of the secondary pulley 22.

The sub-transmission mechanism 30 is a transmission mechanism having two forward gears and one reverse gear. The sub-transmission mechanism 30 includes a Ravigneaux planetary gear mechanism 31 in which two planetary gear carriers are coupled, and a plurality of frictional engagement elements (a Low brake 32, a High clutch 33, and a Rev brake 34) connected to a plurality of rotation elements forming the Ravigneaux planetary gear mechanism 31, the frictional engagement elements for changing a coupling state of the elements. When the hydraulic pressure supplied to each of the frictional engagement elements 32 to 34 is adjusted and a engagement/release state of each of the frictional engagement elements 32 to 34 is changed, a gear position of the sub-transmission mechanism 30 is changed.

For example, when the Low brake 32 is engaged and the High clutch 33 and the Rev brake 34 are released, the gear position of the sub-transmission mechanism 30 becomes a first gear. When the High clutch 33 is engaged and the Low brake 32 and the Rev brake 34 are released, the gear position of the sub-transmission mechanism 30 becomes a second gear whose speed ratio is lower than the first gear. When the Rev brake 34 is engaged and the Low brake 32 and the High clutch 33 are released, the gear position of the sub-transmission mechanism 30 becomes a reverse gear.

The frictional engagement elements 32 to 34 are provided in the former part or a latter part of the variator 20 on the power transmission route. When any of the frictional engagement elements 32 to 34 is engaged, power transmission of the transmission 4 is enabled, and when all the frictional engagement elements 32 to 34 are released, the power transmission of the transmission 4 is disabled.

The hydraulic control circuit 11 is formed by a plurality of flow passages and a plurality of hydraulic control valves. Based on shift control signals from a controller 12, the hydraulic control circuit 11 controls the plurality of hydraulic control valves to switch a supply route of the hydraulic pressure, and adjusts a necessary hydraulic pressure from the hydraulic pressure generated in the mechanical oil pump 10m or the electric oil pump 10e to supply this to the parts of the transmission 4. Thereby, the speed ratio of the variator 20 and the gear position of the sub-transmission mechanism 30 are changed, so that the transmission 4 is shifted.

Figure 2:
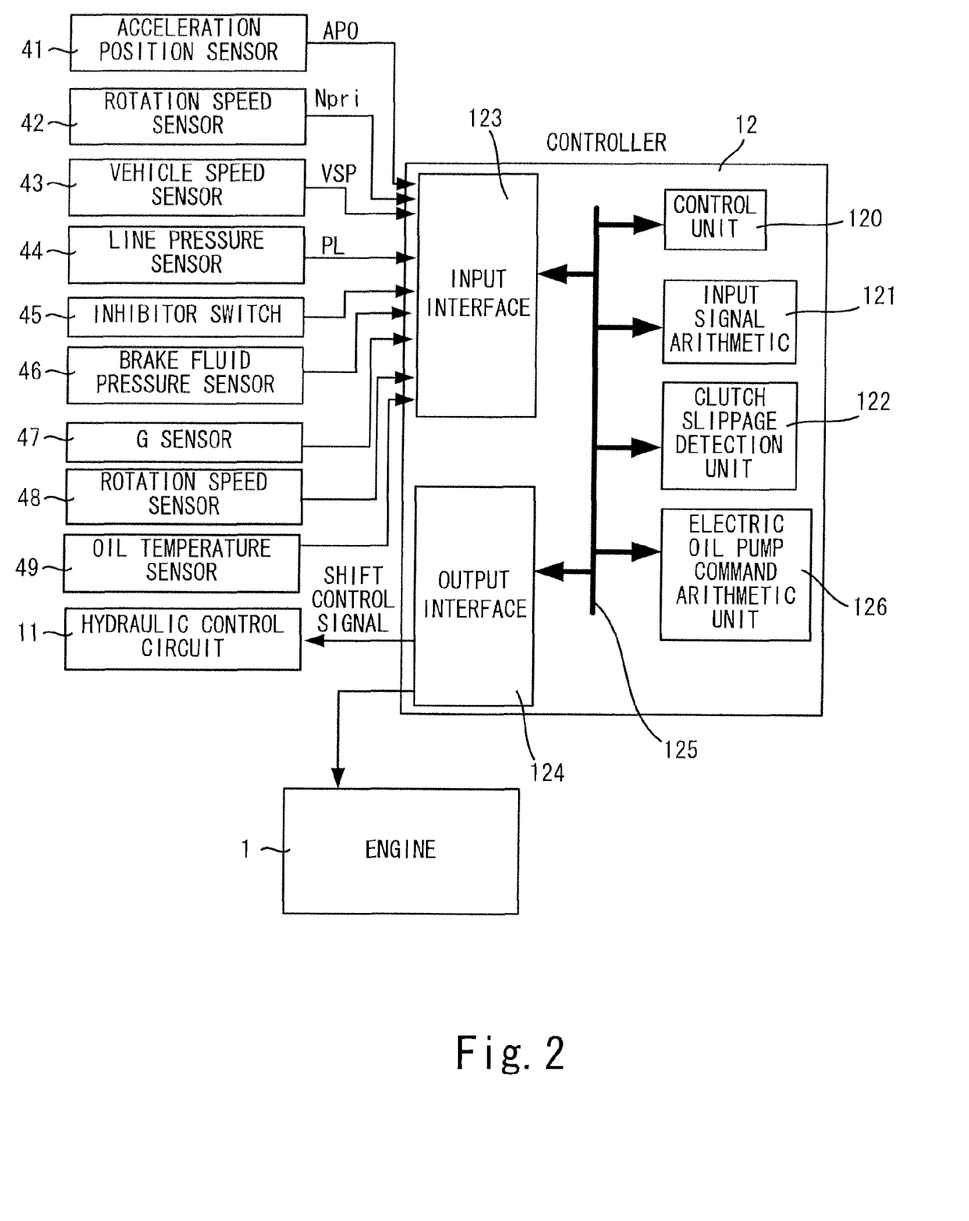
FIG. 2 is a schematic configuration diagram of a controller of the present embodiment.

The controller 12 is a controller for integrally controlling the engine 1 and the transmission 4, and as shown in FIG. 2, formed by an input interface 123, an output interface 124, an input signal arithmetic unit 121, a clutch slippage detection unit 122, an electric oil pump command arithmetic unit 126, a control unit 120, and a bus 125 for connecting these units to each other. The controller 12 is formed by a CPU, a ROM, a RAM, and the like, and when the CPU reads a program stored in the ROM, functions of the controller 12 are exerted.

An output signal of an acceleration position sensor 41 for detecting an accelerator position APO serving as an operation amount of an accelerator pedal, an output signal of a rotation speed sensor 42 for detecting an input rotation speed of the transmission 4, output signals of a rotation speed sensor 48 for detecting an output rotation speed of the transmission 4 and a vehicle speed sensor 43 for detecting a vehicle speed VSP, an output signal of a line pressure sensor 44 for detecting the line pressure PL, an output signal of an inhibitor switch 45 for detecting a position of a selection lever, an output signal of a brake fluid pressure sensor 46 for detecting a brake fluid pressure, an output signal of a G sensor 47 for detecting an acceleration or a deceleration of the vehicle, an output signal of an oil temperature sensor 49, and the like are inputted to the input interface 123.

The input signal arithmetic unit 121 calculates a rotation speed on the side of the drive wheel 7 (hereinafter, referred to as the first rotation speed) of the sub-transmission mechanism 30 from the output signal of the vehicle speed sensor 43, and calculates a rotation speed on the engine side (hereinafter, referred to as the second rotation speed) of the sub-transmission mechanism 30 from the output signal of the rotation speed sensor 48.

The clutch slippage detection unit 122 determines whether or not a slippage occurs in the High clutch 33, and calculates a slippage amount of the High clutch 33.

The control unit 120 is connected to the input interface 123, the input signal arithmetic unit 121, and the like, and controls the vehicle including these units. The control unit 120 performs various arithmetic processing to various signals inputted via the input interface 123, to generate the shift control signals and the like and output the generated signals to the hydraulic control circuit 11 and the engine 1 via the output interface 124.

In order to suppress a fuel consumption amount and improve fuel efficiency, the control unit 120 performs coast stop control to be described below.

The coast stop control is control of automatically stopping the engine 1 and suppressing the fuel consumption amount while the vehicle runs in a low vehicle speed region. The coast stop control is common to fuel cut control to be executed at the time of turning an accelerator off in the point that fuel supply to the engine 1 is stopped, but is different from the fuel cut control in the point that the lock-up clutch 2a is released, the power transmission route between the engine 1 and the drive wheel 7 is cut off, and the rotation of the engine 1 is completely stopped.

Upon executing the coast stop control, the control unit 120 firstly determines for example coast stop conditions a to d shown below. In other words, these conditions are conditions for determining whether or not a driver has an intention to stop the vehicle.

a: a foot is removed from the accelerator pedal (accelerator position APO=0).
b: a brake pedal is depressed (the brake fluid pressure is a predetermined valve or more).
c: the vehicle speed is a predetermined coast stop start vehicle speed or less.
d: the lock-up clutch 2a is released.

In a case where all these coast stop conditions are met, the control unit 120 executes the coast stop control.

When the coast stop control is executed, the hydraulic pressure required for the High clutch 33, the variator 20, and the like is generated by the electric oil pump 10e since the rotation of the engine 1 completely stops. A discharge pressure of the electric oil pump 10e is calculated by the electric oil pump command arithmetic unit 126, and a drive signal of the electric oil pump 10e is outputted based on the calculated discharge pressure. The electric oil pump 10e is controlled based on the drive signal.

Figure 3:
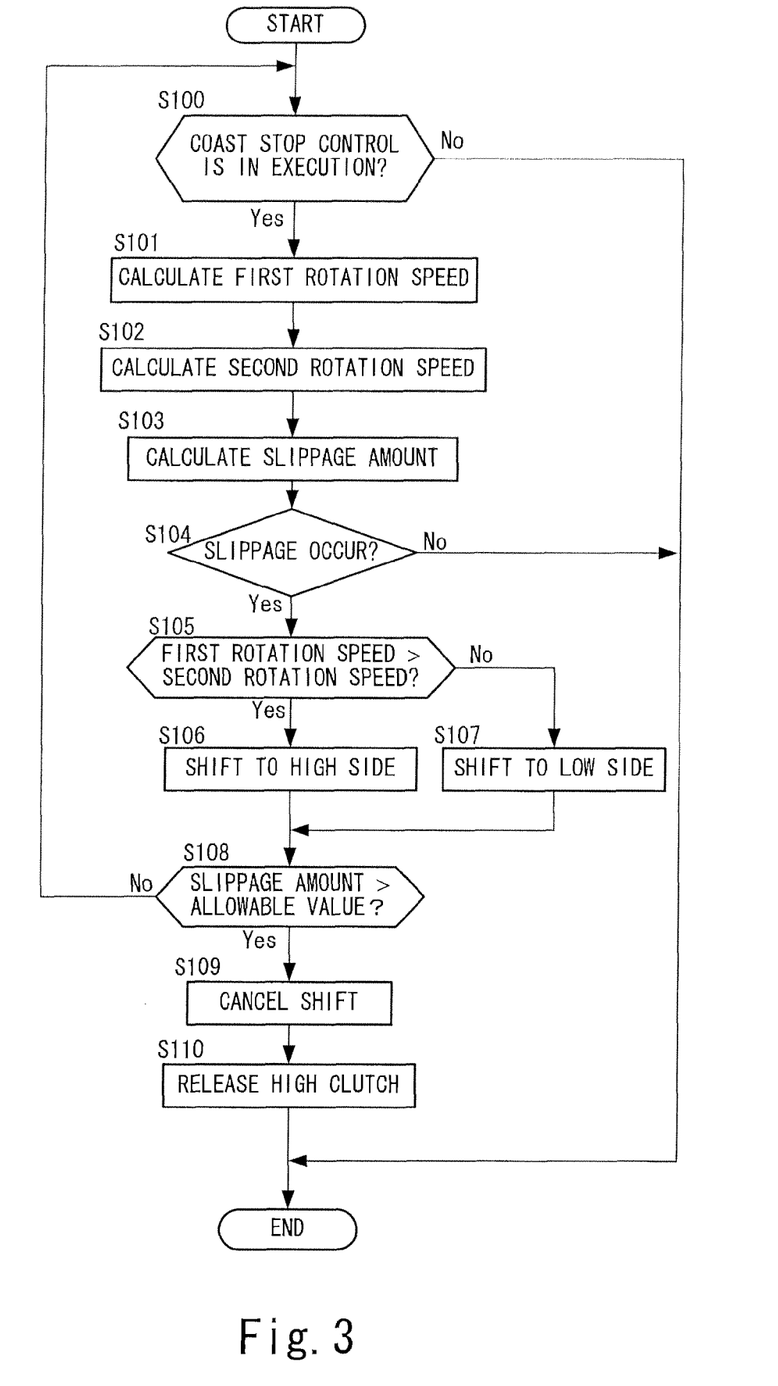
FIG. 3 is a flowchart for illustrating coast stop control of the present embodiment.

Next, the coast stop control in the present embodiment will be described with using a flowchart of FIG. 3.

In Step S100, the control unit 120 determines whether or not the coast stop control is in execution. Specifically, the control unit 120 determines whether or not all the above conditions are met. In a case where all the above conditions are met, the control unit 120 determines that the coast stop control is in execution and proceeds to Step S101. Meanwhile, in a case where any of the above conditions is not met, the control unit 120 determines that the coast stop control is not in execution and finishes the present control.

In Step S101, the input signal arithmetic unit 121 calculates the first rotation speed from the output signal of the vehicle speed sensor 43.

In Step S102, the input signal arithmetic unit 121 calculates the second rotation speed from the output signal of the rotation speed sensor 48. The second rotation speed is calculated in consideration with the speed ratio in the High clutch 33, the number of teeth of the second gear train 5 and the final reduction gear 6, or the like. In a case where the slippage does not occur in the High clutch 33, the first rotation speed and the second rotation speed match with each other.

In Step S103, the clutch slippage detection unit 122 calculates a rotation speed difference in the High clutch 33 based on the first rotation speed and the second rotation speed, that is, the slippage amount.

In Step S104, the clutch slippage detection unit 122 detects occurrence of the slippage in the High clutch 33. Specifically, in a case where the slippage amount is zero, the clutch slippage detection unit 122 determines that the slippage does not occur in the High clutch 33 and finishes the present control. Meanwhile, in a case where the slippage amount is not zero, the clutch slippage detection unit 122 determines that the slippage occurs in the High clutch 33 and proceeds to Step S105.

It may be determined that the slippage occurs in the High clutch 33 in a case where an absolute value of the slippage amount is larger than a predetermined value. The predetermined value is a preliminarily set value, the value with which it can be determined that the slippage does not occur in the High clutch 33 or the slippage is so minute that durability of the High clutch 33 is not problematic.

In Step S105, the control unit 120 compares the first rotation speed and the second rotation speed, and determines whether or not the first rotation speed is higher than the second rotation speed. The control unit 120 proceeds to Step S106 in a case where the first rotation speed is higher than the second rotation speed, and proceeds to Step S107 in a case where the second rotation speed is higher than the first rotation speed.

Figure 4:
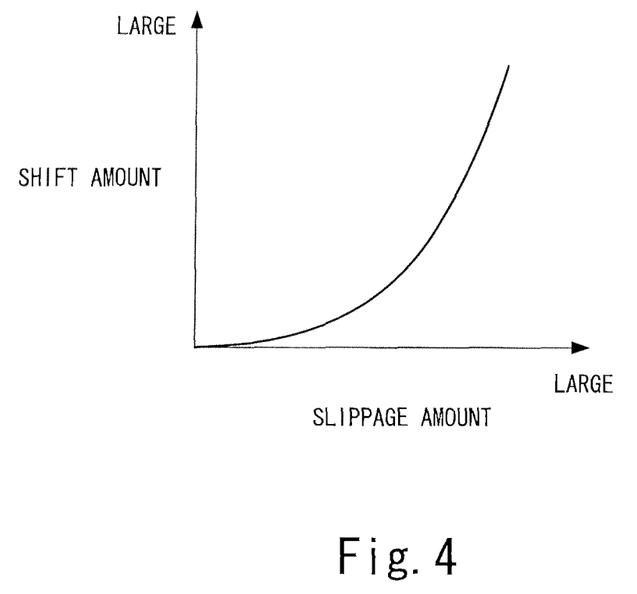
FIG. 4 is a map showing a relationship between a slippage amount and a shift amount of a variator.

In Step S106, the control unit 120 shifts the variator 20 to the High side based on the slippage amount calculated in Step S103. A shift amount of the variator 20 is calculated from a map shown in FIG. 4 based on the slippage amount. FIG. 4 is the map showing a relationship between the slippage amount and the shift amount. The shift amount becomes larger as the slippage amount is larger, and the variator 20 is shifted to the High side more as the slippage amount is larger. When the variator 20 is shifted to the High side, a rotation speed of a turbine shaft of the torque converter 2 is reduced.

Figure 5:
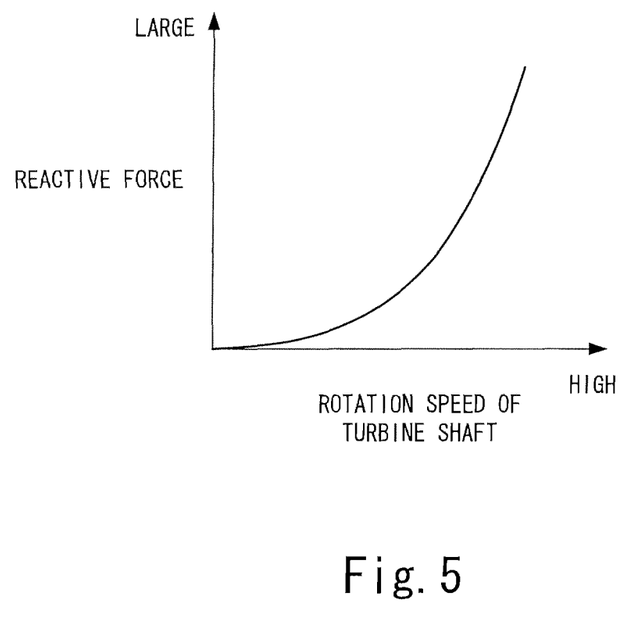
FIG. 5 is a map showing a relationship between a rotation speed of a turbine shaft and a reactive force received by the turbine shaft.

During the coast stop control, the engine 1 is stopped and the lock-up clutch 2a of the torque converter 2 is released. Therefore, the turbine shaft receives a reactive force with respect to rotation of the turbine shaft of the torque converter 2. FIG. 5 shows a relationship between the rotation speed of the turbine shaft and the reactive force received by the turbine shaft. The reactive force received by the turbine shaft becomes larger as the rotation speed of the turbine shaft becomes higher.

In a case where the slippage occurs in the High clutch 33 and the first rotation speed is higher than the second rotation speed, the control unit 120 reduces the rotation speed of the turbine shaft and reduces the reactive force received by the turbine shaft by shifting the variator 20 to the High side. Thereby, a torque inputted to the High clutch 33 is lowered and the hydraulic pressure required for engaging the High clutch 33 can be lowered. Thus, without increasing the hydraulic pressure supplied to the High clutch 33, the slippage occurred in the High clutch 33 can be suppressed. In addition, by shifting the variator 20 to the High side, a lowering amount of the second rotation speed is decreased. As a result, the rotation speed difference between the first rotation speed and the second rotation speed can be reduced, and the slippage occurred in the High clutch 33 can be further suppressed.

In Step S107, the control unit 120 shifts the variator 20 to the Low side based on the slippage amount calculated in Step S103. The shift amount of the variator 20 is calculated from the map shown in FIG. 4 based on the slippage amount. The variator 20 is shifted to the Low side more as the slippage amount is larger. When the variator 20 is shifted to the Low side, the lowering amount of the second rotation speed is increased. Thus, the rotation speed difference between the first rotation speed and the second rotation speed can be reduced, and the slippage occurred in the High clutch 33 can be suppressed.

In Step S106 and Step S107, the shift amount is calculated from the map shown in FIG. 4. However, the shift amount to the High side and the shift amount to the Low side may be calculated from different maps.

In Step S108, the control unit 120 compares the slippage amount calculated in Step S103 and an allowable value. The control unit 120 proceeds to Step S109 in a case where the slippage amount is larger than the allowable value, and returns to Step S100 and repeats the above control in a case where the slippage amount is the allowable value or less. The allowable value is a preliminarily set value, the value being set by the hydraulic pressure supplied from the electric oil pump 10e and a time after starting the coast stop control until the vehicle speed becomes zero. Even in a case of a large slippage amount, when the variator 20 can he shifted, the slippage can he ended. Even in a case of a large slippage amount, when a time in which the coast stop control is executed is long, the slippage is ended during the time. However, the hydraulic pressure supplied from the electric oil pump 10e is not as high as the hydraulic pressure supplied from the mechanical oil pump 10m, and a shift speed of the variator 20 is low. Since the coast stop control is executed after the vehicle speed becomes low, the time until the vehicle speed becomes zero is not long. Thus, the allowable value with which the slippage can be ended by the shift of the variator 20 is set based on the time after starting the coast stop control until the vehicle speed becomes zero. In a case where the slippage amount is larger than the allowable value, the control unit 120 determines that the slippage cannot be ended and proceeds to Step S109. The hydraulic pressure supplied from the electric oil pump 10e is for example a maximum discharge pressure of the electric oil pump 10e, an average pressure during the coast stop control, or the like. The time after starting the coast stop control until the vehicle speed becomes zero is for example an average time after starting the coast stop control until the vehicle speed becomes zero, or the like.

In Step S109, the control unit 120 cancels the shift of the variator 20.

In Step S110, the control unit 120 releases the High clutch 33.

In a case where the slippage of the High clutch 33 cannot be ended by shifting the variator 20, by releasing the High clutch 33, the slippage of the High clutch 33 is eliminated and the durability of the High clutch 33 is suppressed from lowering.

The variator 20 may be shifted to the most Low after the High clutch 33 is released. Thereby, in a case where re-acceleration is demanded, the vehicle can be started in a state where the speed ratio of the variator 20 is the lowest speed ratio, and a re-starting property can be improved.

Figure 6:
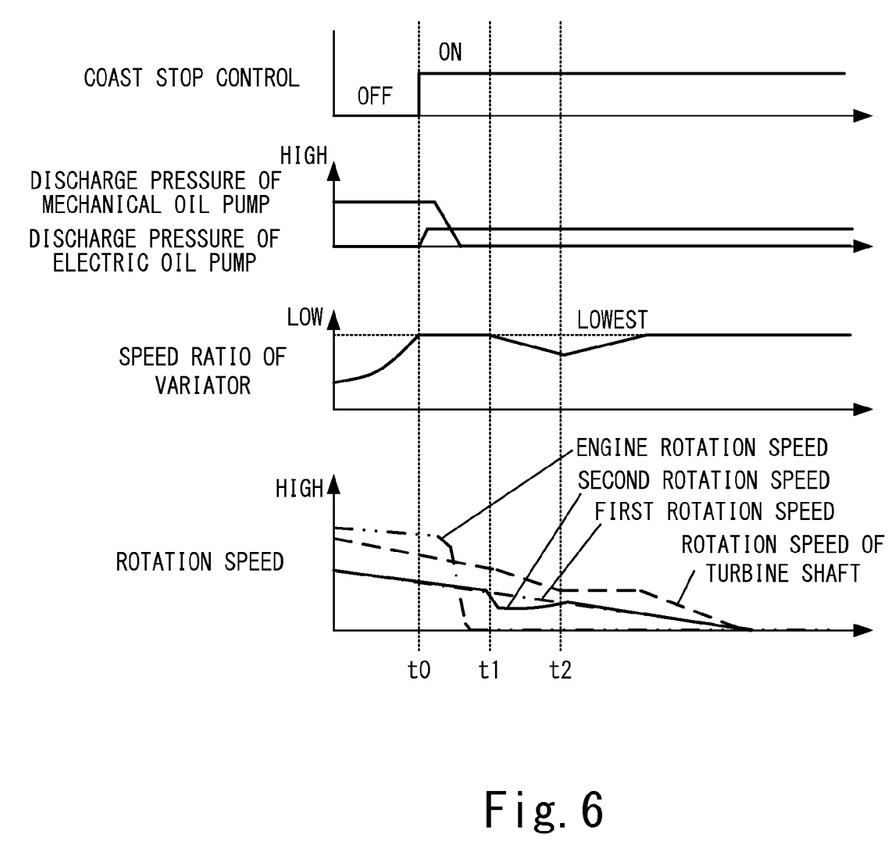
FIG. 6 is a time chart in a case where the coast stop control of the present embodiment is executed.
Figure 7:
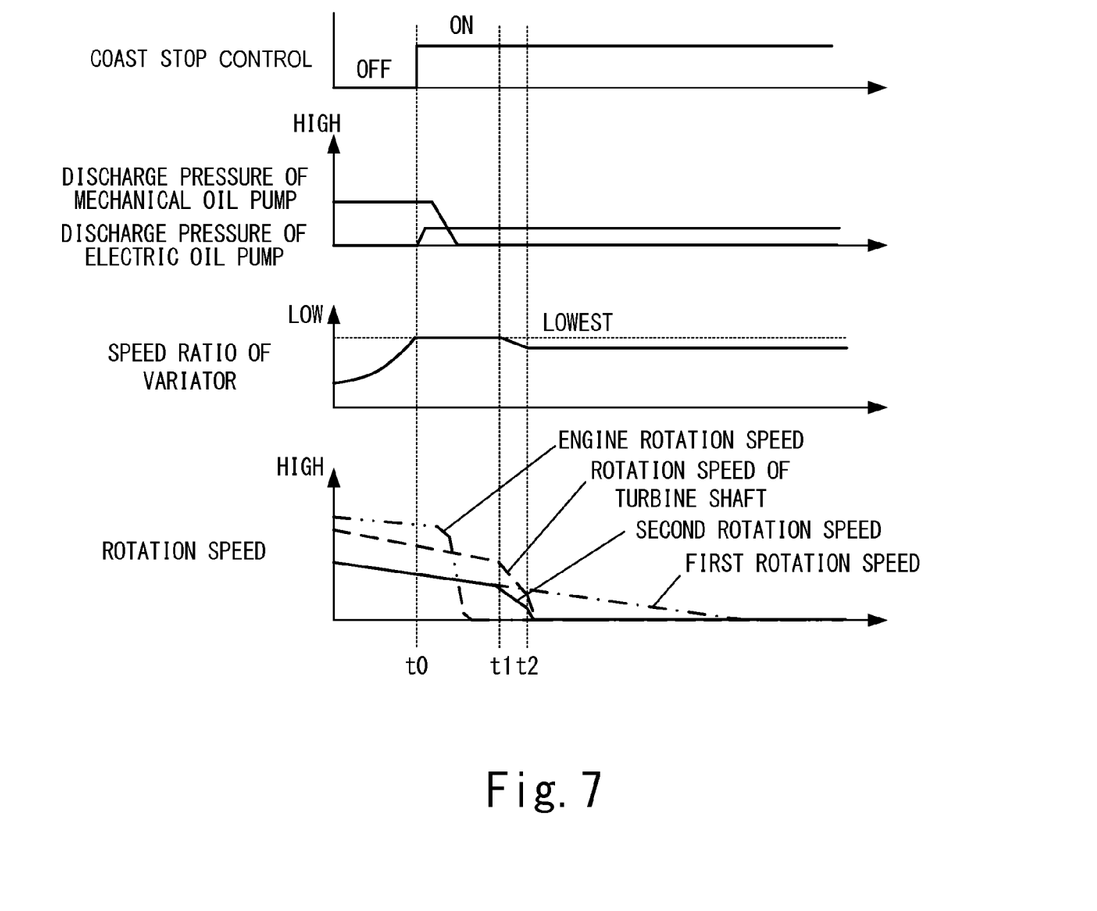
FIG. 7 is a time chart in a case where the coast stop control of the present embodiment is executed.
Figure 8:
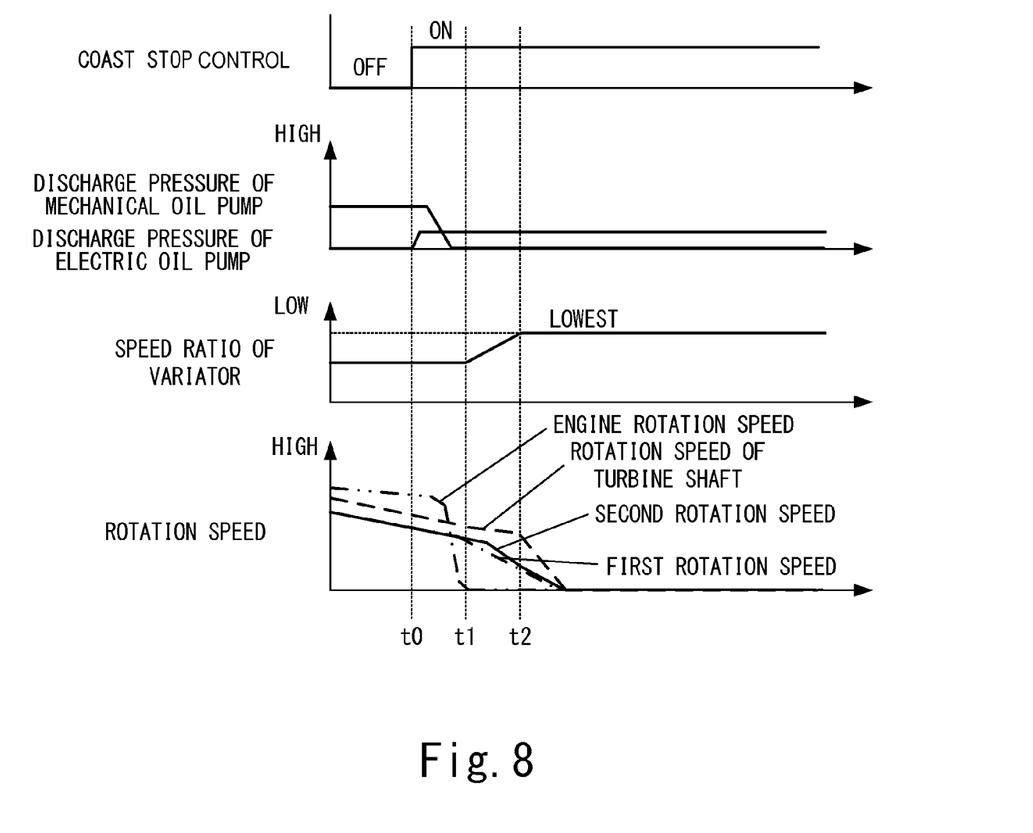
FIG. 8 is a time chart in a case where the coast stop control of the present embodiment is executed.

Next, changes in the first rotation speed, the second rotation speed, and the like in a case where the coast stop control of the present embodiment is executed will be described with using time charts of FIGS. 6 to 8. In FIGS. 6 to 8, an engine rotation speed is shown by a double chain line, the rotation speed of the turbine shaft is shown by a broken line, the second rotation speed is shown by a solid line, and the first rotation speed is shown by a one chain line.

FIG. 6 is a time chart of a case where the hydraulic pressure is insufficient in the High clutch 33 for example due to variation of a dischargeable pressure of the electric oil pump 10e, and the slippage occurs in the High clutch 33. In such a case, the second rotation speed becomes lower than the first rotation speed and the slippage occurs in the High clutch 33.

At a time t0, when the coast stop control is started, the engine 1 is stopped. Thereby, a discharge pressure of the mechanical oil pump 10m is lowered. The electric oil pump 10e is driven and the discharge pressure of the electric oil pump 10e is increased. Due to stoppage of the engine 1, the rotation speed of the engine 1 is radically lowered.

At a time t1, when the lowering amount of the second rotation speed is increased, the second rotation speed becomes lower than the first rotation speed, and the slippage occurs in the High clutch 33, the variator 20 is shifted to the High side. Thereby, the reactive force received by the turbine shaft of the torque converter 2 is reduced, and the hydraulic pressure required for engaging the High clutch 33 can be lowered. Thus, without increasing the hydraulic pressure supplied to the High clutch 33, the slippage can be suppressed. Since the lowering amount of the second rotation speed is decreased, the rotation speed difference between the first rotation speed and the second rotation speed can be reduced, and the slippage can be further suppressed.

At a time t2, when the slippage of the High clutch 33 is ended, the variator 20 is shifted to the Low side.

FIG. 7 is a time chart of a case where the slippage occurs in the High clutch 33 as well as FIG. 6, and the slippage amount is larger than FIG. 6.

At the time t0, the coast stop control is started.

At the time t1, when the slippage occurs in the High clutch 33, the variator 20 is shifted to the High side.

At the time t2, when the slippage amount becomes larger than the allowable value, the shift of the variator 20 is canceled and the High clutch 33 is released. Due to release of the High clutch 33, the rotation is not transmitted to the variator 20 and the turbine shaft of the torque converter 2. Thus, the second rotation speed and the rotation speed of the turbine shaft are radically lowered. However, the slippage of the High clutch 33 is eliminated.

FIG. 8 is a time chart of a case where the slippage occurs in the High clutch 33 for example due to radical deceleration or running on a rough road. In such a case, the first rotation speed becomes lower than the second rotation speed, and the slippage occurs in the High clutch 33.

At the time t0, the coast stop control is started.

At the time t1, when the slippage occurs in the High clutch 33, the variator 20 is shifted to the Low side. Thereby, the lowering amount of the second rotation speed is increased, and the rotation speed difference between the first rotation speed and the second rotation speed can be reduced. Now, the variator 20 is shifted to the most Low.

At the time t2, even after the slippage of the High clutch 33 is ended, the speed ratio of the variator 20 is held at the lowest speed ratio.

Effects of the embodiment of the present invention will be described.

In a case where the slippage occurs in the High clutch 33 for example due to variation of the dischargeable pressure of the electric oil pump 10e, radical deceleration, running on a rough road, or vehicle acceleration on a downward slope, by shifting the variator 20, the slippage of the High clutch 33 is suppressed and the durability of the High clutch 33 can be improved.

In a case where the slippage occurs in the High clutch 33 and the second rotation speed is lower than the first rotation speed, the variator 20 is shifted to the High side. Thereby, the torque inputted to the High clutch 33 is lowered, and the hydraulic pressure required for engaging the High clutch 33 can be lowered. Thus, without increasing the hydraulic pressure supplied to the High clutch 33, the slippage occurred in the High clutch 33 can be suppressed. The rotation speed of the turbine shaft is reduced, the lowering amount of the second rotation speed is decreased, and the slippage of the High clutch 33 can be further suppressed.

In a case where the slippage occurs in the High clutch 33 and the first rotation speed is lower than the second rotation speed, the variator 20 is shifted to the Low side. Thereby, the rotation speed of the turbine shaft is increased, the lowering amount of the second rotation speed is increased, and the slippage of the High clutch 33 can be suppressed.

During the coast stop control, the hydraulic pressure is supplied to the High clutch 33 and the variator 20 by the electric oil pump 10e. In a case where the slippage occurs in the High clutch 33 during the coast stop control, by increasing the hydraulic pressure supplied to the High clutch 33, the slippage of the High clutch 33 can also be suppressed.

However, there is sometimes a case where the hydraulic pressure required for not occurring the slippage in the High clutch 33 becomes higher than the hydraulic pressure required for shifting the variator 20. Since the variator 20 is shifted in accordance with a differential pressure between the hydraulic pressure of the primary pulley 21 and the hydraulic pressure of the secondary pulley 22, the variator 20 can be shifted by supplying the hydraulic pressure in such a manner that the differential pressure is generated even if its amount is slight. Meanwhile, the High clutch 33 is the frictional engagement element. Once the slippage occurs, the hydraulic pressure has to be supplied in accordance with the slippage in order to suppress the slippage, so that there is a fear that the supplied hydraulic pressure is increased. In a case where the torque inputted to the High clutch 33 is large, the hydraulic pressure required for suppressing the slippage is further increased. When the supplied hydraulic pressure is increased, a power consumption amount of the electric oil pump 10e is increased.

In the present embodiment, in a case where the slippage occurs in the High clutch 33 during the coast stop control, for example not by increasing the hydraulic pressure supplied to the High clutch 33 and engaging the High clutch 33 but by shifting the variator 20 and suppressing the slippage of the High clutch 33, a change amount (increase amount) of the discharge pressure of the electric oil pump 10e can be decreased. That is, the power consumption amount in the electric oil pump 10e can be decreased.

When the hydraulic pressure supplied to the High clutch 33 is increased, the torque is transmitted from the High clutch 33, and the slippage occurs between the pulleys 21, 22 and the V belt 23 of the variator 20, so that there is a fear that the variator 20 is deteriorated.

In the present embodiment, by shifting the variator 20 and suppressing the slippage of the High clutch 33, the slippage of the High clutch 33 can be suppressed while suppressing deterioration of the variator 20.

In a case where the slippage occurs in the High clutch 33 during the coast stop control and when the re-acceleration is demanded by the driver, the coast stop control is canceled and the engine 1 is re-started. When the engine 1 is re-started, a high hydraulic pressure is supplied from the mechanical oil pump 10m. Thus, the High clutch 33 is completely engaged. At this time, a engagement shock in accordance with the slippage amount occurs. When the slippage amount is large, the engagement shock also becomes large.

In the present embodiment, by suppressing the slippage occurred in the High clutch 33 during the coast stop control, even in a case where the re-acceleration is demanded during the coast stop control, the engagement shock occurred in the High clutch 33 can be suppressed.

In a case where a slip amount is larger than the allowable value with which the slippage of the High clutch 33 can be suppressed by the shift of the variator 20, the slippage of the High clutch 33 is not easily suppressed by the shift of the variator 20 during the coast stop control. Thus, by releasing the High clutch 33 and preventing heat generation in the High clutch 33, the durability of the High clutch 33 can be improved.

In the above embodiment, a case where the slippage occurs in the High clutch 33 is described. However, the above control may be executed in a case where the slippage occurs in the Low brake 32 or the like in order to suppress the slippage of the Low brake 32 or the like.

The present invention is not limited to the frictional engagement elements in the sub-transmission mechanism 30. For example, the above control may be executed as control for frictional engagement elements of a forward/reverse switching mechanism.

The sub-transmission mechanism 30 is provided between the variator 20 and the drive wheel 7, that is, on the downstream side of the variator 20. However, the sub-transmission mechanism 30 may be provided between the variator 20 and the engine 1, that is, on the upstream side of the variator 20. In a case where the sub-transmission mechanism 30 is provided on the upstream side of the variator 20, the slippage occurs in the High clutch 33, and the first rotation speed on the side of the drive wheel 7 of the sub-transmission mechanism 30 is higher than the second rotation speed on the side of the engine 1 of the sub-transmission mechanism 30, the variator 20 is shifted to the High side. Thereby, a lowering amount of the first rotation speed is increased, the rotation speed difference between the first rotation speed and the second rotation speed can be reduced, and the slippage occurred in the High clutch 33 can be suppressed. Meanwhile, in a case where the second rotation speed is higher than the first rotation speed, the variator 20 is shifted to the Low side. Thereby, the first rotation speed is increased, the rotation speed difference between the first rotation speed and the second rotation speed can be reduced, and the slippage occurred in the High clutch 33 can be suppressed. The first rotation speed and the second rotation speed are detected from the rotation speed sensor 48, a separately-provided rotation speed sensor, and the like.

In the above embodiment, the variator 20 is shifted in order to suppress the slippage in the sub-transmission mechanism 30. However, instead of the sub-transmission mechanism 30 and the variator 20, a continuously variable transmission, a stepped transmission, and a forward-reverse switching mechanism may be combined, and the above control may be executed.

The "detecting the slippage" in the above embodiment includes a state where the slippage actually occurs in the High clutch 33, and a state where the occurrence of the slippage in the High clutch 33 is predicted. In the above embodiment, the slippage of the High clutch 33 is detected based on the output signals obtained by the rotation speed sensor 48 and the vehicle speed sensor 43. However, the slippage of the High clutch 33 may be predicted based on the deceleration of the vehicle. The deceleration of the vehicle can be detected not only from the G sensor 47 but also from the brake fluid pressure sensor 46, a hydraulic sensor of the High clutch 33 or the like, and the like. Thereby, the slippage of the High clutch 33 can be detected without using the rotation speed sensor 48 or the like.

The transmission 4 may be not only the belt-type continuously variable transmission mechanism but also for example a chain-type continuously variable transmission, a toroidal continuously variable transmission, or a stepped transmission. The same effects as the present embodiment can also be obtained with using these transmissions.

Although the hydraulic pressure is supplied to the variator 20 by the electric oil pump 10e during the coast stop control, the variator 20 may be shifted by cranking the engine 1 by the starter 1a, temporarily driving the mechanical oil pump 10m, and supplying the hydraulic pressure to the variator 20 by the mechanical oil pump 10m. While cranking by the starter 1a, fuel injection is not performed to the engine 1, and an output shaft of the engine 1 is rotated only by cranking by the starter 1a. The hydraulic pressure generated by cranking by the starter 1a is low. However, the hydraulic pressure is generated not for engaging the High clutch 33 but for shifting the variator 20. Thus, the hydraulic pressure generated by cranking may be low.

In a case where the variator 20 has a bias means such as a spring for biasing to narrow the width of the V groove of the secondary pulley or to narrow the width of the V groove of the primary pulley, the variator 20 may be shifted during the coast stop control by discharging the hydraulic pressure from the variator 20. Thereby, the control of the present embodiment can be executed without using the electric oil pump 10e.

In the above embodiment, the slippage amount is calculated based on the rotation speed difference between the first rotation speed and the second rotation speed. However, based on a depression amount of the brake pedal detected by the brake fluid pressure sensor 46, a forward/reverse acceleration/deceleration detected by the G sensor 47, or the like, the first rotation speed and the second rotation speed may be estimated and the slippage amount may be estimated.

The embodiment of the present invention is described above. However, the above embodiment only shows a part of application examples of the present invention, and the technical scope of the present invention is not limited to specific configurations of the above embodiment.

The present application claims priority based on Japanese Patent Application No. 2011-187370 which has already been filed to the Japan Patent Office on Aug. 30, 2011, and all the contents of this application is incorporated herein by reference.

The invention claimed is:

1. A vehicle control device for controlling a vehicle including a frictional engagement element arranged between a drive source and a drive wheel, and a power transmission mechanism which is arranged in series with the frictional engagement element, the power transmission mechanism being shifted between an input shaft and an output shaft, the vehicle control device comprising:

a slip detection unit configured to detect whether or not a slip occurs in the frictional engagement element; and a control unit configured to reduce the slip by shifting the power transmission mechanism in a case where occurrence of the slip is detected by the slip detection unit, wherein:

the control unit is configured to stop the drive source during running of the vehicle when a predetermined condition is met, the vehicle control device further comprises a hydraulic pressure supply unit configured to supply a hydraulic pressure to the power transmission mechanism in a case where the drive source is stopped during the running of the vehicle, the power transmission mechanism is a variator in which a power transmission member is looped over two pulleys, which enables continuously shifting between the input shaft and the output shaft, and the control unit shifts the variator via the hydraulic pressure supplied from the hydraulic pressure supply unit.

2. The vehicle control device according to claim 1, wherein:

the control unit is configured to compare a first rotation speed serving as a rotation speed on a drive wheel side of the frictional engagement element, and a second rotation speed serving as a rotation speed on a drive source side of the frictional engagement element, in a case where the occurrence of the slip is detected and the first rotation speed is higher than the second rotation speed, the control unit shifts the power transmission mechanism to a High side.

3. The vehicle control device according to claim 2, comprising:

an input signal unit configured to detect the first rotation speed and to detect the second rotation speed.

4. The vehicle control device according to claim 1, wherein:

the control unit is configured to compare a first rotation speed serving as a rotation speed on a drive wheel side of the frictional engagement element, and a second rotation speed serving as a rotation speed on a drive source side of the frictional engagement element, in a case where the occurrence of the slip is detected and the second rotation speed is higher than the first rotation speed, the control unit shifts the power transmission mechanism to a Low side.

5. The vehicle control device according to claim 1, wherein the hydraulic pressure supply unit is an electric oil pump.

6. The vehicle control device according to claim 1, comprising:

a cranking unit configured to crank the drive source, wherein the hydraulic pressure supply unit is a mechanical oil pump to be driven by transmitting rotation of the drive source, and the control unit shifts the variator via a hydraulic pressure generated in the mechanical oil pump by cranking the drive source.

7. The vehicle control device according to claim 1, wherein the slip detection unit is configured to calculate a slip amount of the frictional engagement element; and the control unit is configured to release the frictional engagement element in a case where the slip amount is larger than an allowable value with which the slip is capable of being ended by shift in the power transmission mechanism.

8. The vehicle control device according to claim 7, wherein the control unit shifts the power transmission mechanism to a Low side after the frictional engagement element is released by the control unit.

9. A control method for controlling, by a controller, a vehicle including a frictional engagement element arranged between a drive source and a drive wheel, and a power transmission mechanism arranged in series with the frictional engagement element, the power transmission mechanism being shifted between an input shaft and an output shaft, the control method comprising:

detecting whether or not a slip occurs in the frictional engagement element; and reducing the slip by shifting the power transmission mechanism in a case where occurrence of the slip is detected, wherein:

the controller does not shift the power transmission mechanism in a case where the occurrence of the slip is not detected, the control method further comprises stopping the drive source during running of the vehicle when a predetermined condition is met, and supplying, via a hydraulic pressure supply unit, a hydraulic pressure to the power transmission mechanism in a case where the drive source is stopped during the running of the vehicle, the power transmission mechanism is a variator in which a power transmission member is looped over two pulleys, which enables continuously shifting between the input shaft and the output shaft, and the controller shifts the variator via the hydraulic pressure supplied from the hydraulic pressure supply unit.

10. A vehicle control device for controlling a vehicle including a frictional engagement element arranged between a drive source and a drive wheel, and a power transmission mechanism arranged in series with the frictional engagement element, the power transmission mechanism being shifted between an input shaft and an output shaft, the vehicle control device comprising:

slip detection means for detecting whether or not a slip occurs in the frictional engagement element; and control means for reducing the slip by shifting the power transmission mechanism in a case where occurrence of the slip is detected by the slip detection means and for stopping the drive source during running of the vehicle when a predetermined condition is met, wherein:

the vehicle control device further comprises hydraulic pressure supply means for supplying a hydraulic pressure to the power transmission mechanism in a case where the drive source is stopped during the running of the vehicle, the power transmission mechanism is a variator in which a power transmission member is looped over two pulleys, which enables continuously shifting between the input shaft and the output shaft, and the control means shifts the variator via the hydraulic pressure supplied from the hydraulic pressure supply means.

* * * * *